(No Model.) 2 Sheets—Sheet 1.
J. D. McLEOD.
CABLE JUNCTION BOX.
No. 477,218. Patented June 21, 1892.
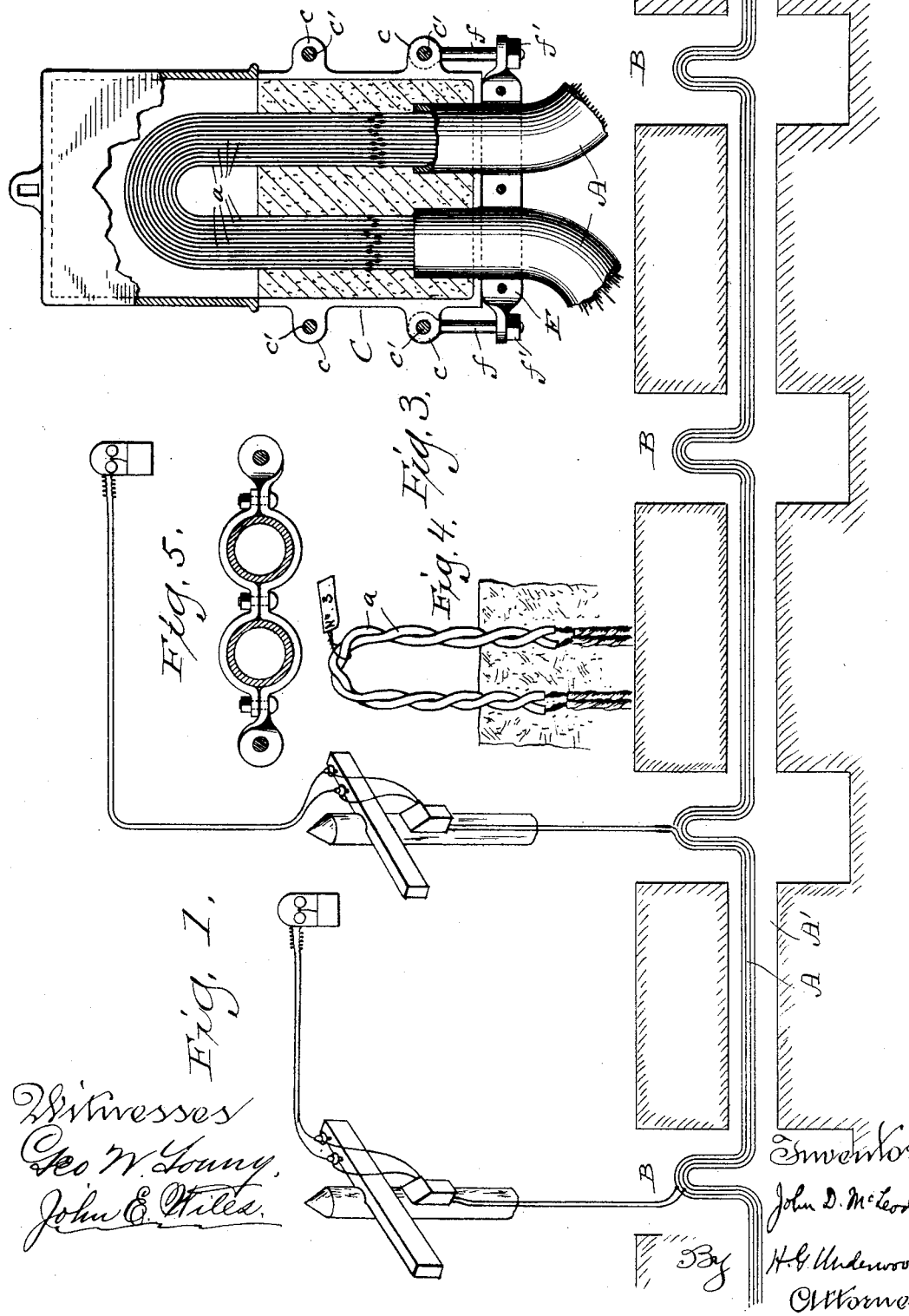

(No Model.) 2 Sheets—Sheet 2.
J. D. McLEOD.
CABLE JUNCTION BOX.
No. 477,218. Patented June 21, 1892.
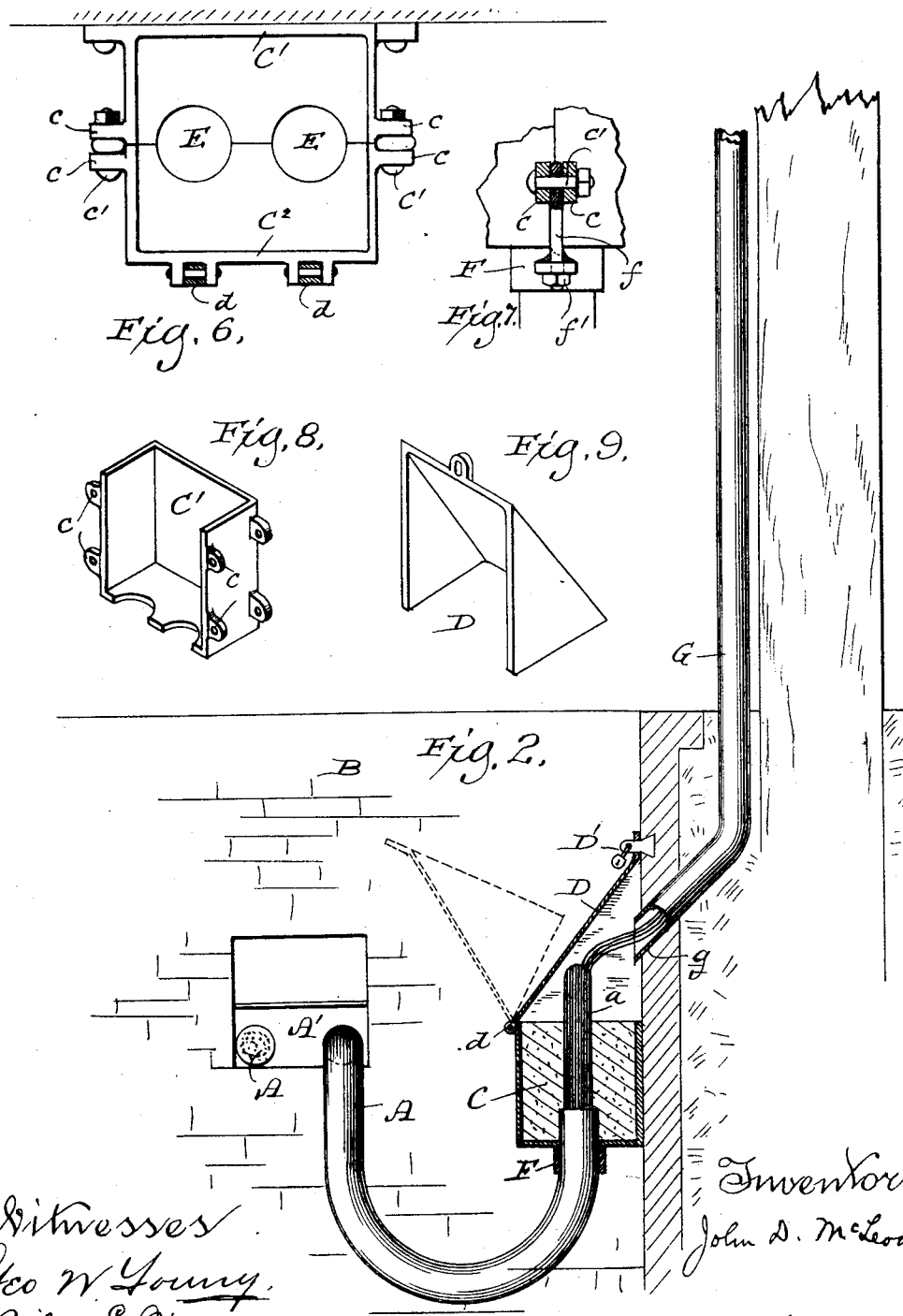

UNITED STATES PATENT OFFICE.

JOHN D. McLEOD, OF MILWAUKEE, WISCONSIN.

CABLE JUNCTION-BOX.

SPECIFICATION forming part of Letters Patent No. 477,218, dated June 21, 1892.

Application filed December 15, 1891. Serial No. 415,133. (No model.)

*To all whom it may concern:*

Be it known that I, JOHN D. MCLEOD, a citizen of the United States, and a resident of Milwaukee, in the county of Milwaukee, and in the State of Wisconsin, have invented certain new and useful Improvements in Systems of and Apparatus for Electrical Distribution; and I do hereby declare that the following is a full, clear, and exact description thereof.

My invention relates to certain new and useful improvements in systems of and apparatus for electrical distribution, and relates more particularly to improvements in underground systems in which a plurality of wires are arranged in the form of a cable and carried to a suitable distribution-station, from which the service-wires are carried to the individual instruments to be operated.

The various features of my invention will be fully hereinafter described, and pointed out in the appended claim.

In the accompanying drawings, illustrating my invention, Figure 1 is a diagrammatic view illustrating my improved system of distribution. Fig. 2 is a transverse vertical section taken through one of the distribution-stations and illustrating my improved method of connecting the service-wires with the wires forming the cable. Fig. 3 is an enlarged sectional view taken at right angles to Fig. 2 and illustrating my improved form of distribution-box and the arrangement of the wires therein. Fig. 4 is an enlarged detail view showing the connections of a pair of cable-wires within the distribution-box with insulated loops which extend above said box. Fig. 5 is a detail view of a clamp for holding the ends of a cable in position. Fig. 6 is a plan view of my improved distribution-box with the cover removed. Fig. 7 is a detail view, partly in section, of the support for the ends of the cable. Fig. 8 is a perspective view of one-half of the distribution-box. Fig. 9 is a similar view of the cover for said box.

In said drawings, A represents a cable composed of a suitable number of electric wires and located within a suitable conduit A'; B B, manholes located at convenient points along the line of said conduit. Within each of the manholes B B is located a distribution-box C, into which the wires forming the cable are carried and from which the service-wires are carried to the instruments to be operated.

As illustrated more particularly in Fig. 3 of the drawings, the cable A is cut at the points where it passes through the manholes B B or formed in suitable lengths to extend from one manhole to another, so as to leave two free ends of the cable at each of said manholes. The ends of the wires forming the cable are then bared for a short distance, and a short piece of insulated wire $a$ is connected with the bared ends of each one of said wires. These short sections $a\, a$ of insulated wire are arranged within the distribution-boxes in the form of loops which extend upwardly for a considerable distance, and the service-wires are connected with these loops and trained over suitable supports to the instruments which are to be operated.

As illustrated more particularly in Figs. 3, 6, 7, and 8, the bottom of each of the distribution-boxes is provided with two circular apertures E E of such diameter as to fit closely around the ends of the cable, and suitable clamps F F are arranged below said apertures and arranged to engage with the outside surfaces of the ends of the cable, so as to firmly secure the same in place. The distribution-boxes are conveniently made in two parts or halves $C'\, C^2$, as illustrated in Figs. 3, 6, 7, and 8, and the parts or halves are each provided with apertured ears $c\, c$, through which bolts $c'\, c'$ are passed to secure said halves together.

Any suitable means may be provided for securing the clamp F in position below the box C—as, for instance, the devices illustrated in Figs. 3, 6, and 7, in which suitable eye-bolts $f\, f$ are secured between the ears $c\, c$ by means of the bolts $c'\, c'$ and arranged to pass through apertures in said clamps, so that nuts $f'\, f'$, turned upon their threaded lower ends in such a manner as to engage with the lower surfaces of the ends of said clamps, firmly hold the same against the bottom of the box C.

A suitable cover D is hinged upon the top of the box C, as at $d\, d$, and is provided with any suitable locking or fastening device D', adapted to secure it in its closed position. This cover may be unfastened and turned back when necessary, as indicated by the dotted lines in Fig. 2, so as to afford access to the interior of the box C. As also illustrated in Fig. 2, a suitable conduit or tube G, capable of containing a number of wires, is arranged upon a suitable pole or other support adjacent to the manhole and is carried below the surface of the ground and into the upper part of the manhole, where it presents a surface practically flush with the wall of the manhole at a point immediately above the box C, as illustrated at $g$, the cover D being arranged to cover the end of said pipe when in its closed position, and the desired number of service-wires are connected with the loops $a\ a$ and carried through said conduit G, whence they are trained to the several instruments to be operated.

In practice I locate the several manholes at a suitable distance apart, the cables being of proper length to extend between said manholes and the lead sheath of the cables removed from the ends thereof in the usual manner and the insulation removed from the ends of the wires. The sections $a\ a$ of insulated wire are connected with the ends of said cable-wires and arranged in the form of upwardly-extending loops in the manner before described. The two halves of the box C are now adjusted in position about the ends of the cable and secured together by the bolts $c'\ c'$, and the clamp F is also engaged with said ends and secured in position below the box C. The box C is now filled with a suitable insulating material, such as asphaltum or the like, which is preferably poured into said box in a melted condition, so as to fill all the spaces between said wires and their connections. This insulating material is filled into a level somewhat below the tops of the loops $a\ a$. When it is desired to connect one or more service-wires with the loops $a\ a$, the insulation is removed from the upper portions of said loops and the service-wires are suitably attached by half-connections to the bared portions of the loops by soldering or otherwise. A suitable covering of insulating material is then placed upon the joints thus formed. If desired, the dead ends of wires in the cable may be severed and straight connections made between the cable-wires and the service-wires.

When it is desired to provide metallic circuits, the wires are conveniently arranged in pairs and the loop-wires $a\ a$, connected with each pair, may be secured together in any desired manner, as by tying or twisting them together at their looped portions, the wires designed for use upon each circuit being thereby kept separate from the rest and suitably tagged or otherwise marked for identification, with the numbers at the cable-heads and all the manholes.

A great difficulty experienced with the systems of underground distribution of electricity employing cables containing a number of wires, as heretofore arranged, has been due to the fact that when a cable is first laid it is desirable to provide extra wires, which may be brought into use from time to time as the growth of the business may require, and in order to provide for this growth an extra number of outlets must be provided at each manhole or distribution-point. This is accomplished by terminating all the wires which the estimated growth of the business at any one locality will require at one of the manholes or points of distribution, these wires being connected with suitable terminals, to which the service-wires may be attached when occasion requires. By this method, therefore, after a cable has once been laid it is impossible to increase the capacity of the system at any one point of distribution beyond the number of outlets originally provided without employing an extra cable, so that in order to provide for any additional growth of business a new cable must be laid. If, on the other hand, the business does not reach the estimated limits, all the extra or unused wires are of no benefit to the system and cannot be utilized to accommodate the growth of the business at any other district. It is therefore obvious that such systems are necessarily very expensive to maintain on account of the large number of extra wires that must necessarily be provided in each district or distribution-point and many of which may never be used, By my improved system, however, these objections are effectually overcome and the wires are made continuous throughout the cable, and any wire in the cable may be "tapped" and made available at any one of the points of distribution along the line of the cable.

In case of a considerable growth of the business at any one district it is obviously only necessary to "tap" the loop-wires connected with the cable-wires which are not in use, and these connections may be made at any convenient point.

If it is desired to connect several instruments with one wire or pair of wires, and these instruments are located at a distance from each other, it is only necessary to connect the service-wires leading to the several instruments with the proper loops at the nearest distribution-point.

As illustrated in Fig. 1 of the drawings, I have shown my improvements as applied to a telephone system in which the service-wires are carried from the distribution-stations to suitable lightning-arresters and from thence over suitable insulators to the telephone-instruments in the usual manner; but it will be of course understood that my improved system and apparatus are equally applicable to telephone, telegraph, or electric-lighting systems.

Having thus described my invention, what I claim as new, and desire to secure by Letters Patent of the United States, is—

A junction-box for electrical distribution, said box containing a filling of insulating material, in combination with a multiple-wire cable entering said box, a corresponding multiple-wire cable issuing therefrom, and loops of insulated wire joining the wires of the respective cables, the joints or splices of the multiple wires with the loops being embedded in the filling of insulating material and the bend of the loops extending beyond said material, subtantially as described.

In testimony that I claim the foregoing I have hereunto set my hand, at Milwaukee, in the county of Milwaukee and State of Wisconsin, in the presence of two witnesses.

JOHN D. McLEOD.

Witnesses:
H. G. UNDERWOOD,
JOHN E. WILES.